United States Patent [19]
Ernst

[11] Patent Number: 5,791,582
[45] Date of Patent: Aug. 11, 1998

[54] SAFETY BELT REELING DEVICE WITH INCLINATION COMPENSATION FOR THE VEHICLE-SENSITIVE SENSOR

[75] Inventor: Hans-Helmut Ernst, Ahrensburg, Germany

[73] Assignee: Autoliv Development AB, Vargarda, Sweden

[21] Appl. No.: 691,483

[22] Filed: Aug. 2, 1996

[51] Int. Cl.⁶ .......................... B60R 22/40; B60R 22/36
[52] U.S. Cl. ...................... 242/384.4; 297/478; 280/806
[58] Field of Search ...................... 242/384.4, 384.5; 297/478; 280/806

[56] References Cited

U.S. PATENT DOCUMENTS

| | | | |
|---|---|---|---|
| 2,872,495 | 2/1959 | Ross | 123/146.5 R |
| 4,004,751 | 1/1977 | Weman et al. | 242/384 |
| 4,164,337 | 8/1979 | Blom | 242/384.4 |

FOREIGN PATENT DOCUMENTS

| | | |
|---|---|---|
| 3611004 | 10/1987 | Germany . |
| 3824164 | 1/1990 | Germany . |
| 1599188 | 9/1981 | United Kingdom . |

*Primary Examiner*—John Q. Nguyen
*Attorney, Agent, or Firm*—Robert W. Becker & Associates

[57] ABSTRACT

An inclination-compensatable safety belt reeling device connected to a vehicle seat, wherein the part of the vehicle seat to which the safety belt reeling device is connected is inclination-adjustable relative to an axis extending to the center of the earth, has a vehicle-sensitive acceleration sensor to be oriented in a nominal position to the center of the earth. A pendulum device with a pendulum mass acts on the acceleration sensor for returning the acceleration sensor into the nominal position when an inclination change occurs. An inertia mass in the form of a deceleration mass sensitive to horizontal acceleration forces is provided. A stationary blocking toothing is also provided. The pendulum mass has laterally projecting arms with guide projections extending in a direction of movement of the deceleration mass. The deceleration mass is positioned with slotted holes on the guide projections so as to be slidingly linearly guided. The deceleration mass has at least one counter toothing for engaging the blocking toothing when deflected from a rest position in order to arrest the pendulum device at the safety belt reeling device. The center of gravity of the deceleration mass in the rest position is located at the pivot point of the pendulum mass.

9 Claims, 5 Drawing Sheets

SAFETY BELT REELING DEVICE WITH INCLINATION COMPENSATION FOR THE VEHICLE-SENSITIVE SENSOR

BACKGROUND OF THE INVENTION

The present invention relates to a safety belt reeling device with inclination compensation whereby a part of the vehicle seat such as the back rest or the seat portion carrying the safety belt reeling device is adjustable in its inclination to an axis oriented to the center of the earth, whereby the safety belt reeling device comprises a vehicle-sensitive acceleration sensor aligned in a nominal position with the center of the earth as well as a pendulum device with a pendulum mass that returns the acceleration sensor upon inclination change into its nominal position, and further comprising an inertia mass activated by acceleration forces which via a locking member arrests the pendulum device relative to the safety belt reeling device.

A safety belt reeling device with the aforementioned features is known from British patent 15 99 188. In this safety belt reeling device a pendulum device is coordinated with the vehicle-sensitive sensor which, upon inclination change of the vehicle seat, respectively, of a corresponding part thereof, returns the vehicle-sensitive sensor of the safety belt reeling device into its nominal position. In order to prevent that such compensation movements occur during horizontal vehicle acceleration or deceleration during operation of the vehicle, a vehicle sensor is arranged at the pendulum device and coupled with a blocking device for the pendulum device. The vehicle sensor locks and arrests upon acceleration-caused deflection the pendulum device in its position. With this known design of a safety belt reeling device with inclination compensation it is disadvantageous that the locking of the pendulum device takes place only with a comparatively great delay. Furthermore, the known device is complicated in its design.

From U.S. Pat. No. 4,164,337, a safety belt reeling device with inclination compensation for the vehicle sensor is known in which the vehicle sensor is arranged in the manner of a pendulum within an indifferently supported pendulum device comprising a compensation pendulum so that, upon change of the inclination of the backrest of a vehicle seat supporting the safety belt reeling device, an alignment of the pendulum device with vehicle sensor attached thereto relative to the center of the earth takes place. Upon vehicle accelerations, the blocking of the entire pendulum device as well as of the coordinated safety belt reeling device takes place. This known safety belt reeling device is also complicated in its construction and its response time is insufficient.

It is therefore an object of the present invention to provide a safety belt reeling device of the aforementioned kind with which a faster response of the blocking mechanism for the pendulum device for compensation of inclination changes is to be achieved and which is simple in its construction and reliable in its function with respect to inclination compensation.

SUMMARY OF THE INVENTION

The inclination-compensatable safety belt reeling device connected to a vehicle seat, wherein the part of the vehicle seat to which the safety belt reeling device is connected is inclination-adjustable relative to the axis extending to the center of the earth, according to the present invention is primarily characterized by:

A vehicle-sensitive acceleration sensor to be oriented in a nominal position to the center of the earth;

A pendulum device with a pendulum mass, pivotable about a pivot point, acting on the acceleration sensor for returning the acceleration sensor into the nominal position when an inclination change occurs;

An inertia mass in the form of a deceleration mass sensitive to horizontal acceleration forces;

A stationary blocking toothing;

The pendulum mass having laterally projecting arms extending in a direction of movement of the deceleration mass;

The arms having guide projections;

The deceleration mass having slotted holes for receiving the guide projections, wherein the guide projections are slidingly linearly guided in the slotted holes;

The deceleration mass having at least one counter toothing for engaging the blocking toothing when deflected from a rest position in order to arrest the pendulum device at the safety belt reeling device;

Wherein a center of gravity of the deceleration mass in the rest position is located at the pivot point of the pendulum mass.

Advantageously, the safety belt reeling device further comprises a sensor spring for securing the deceleration mass in the rest position.

Preferably, the sensor spring is a vertically extending bar spring having a point of application at the center of gravity of the deceleration mass.

Expediently, the sensor spring is a bracket spring positioned at one side of the deceleration mass in the direction of travel of the vehicle and supported at a stationary part of the safety belt reeling device and at the deceleration mass.

Expediently, the deceleration mass has a groove facing the blocking toothing and the bracket spring is secured in the groove. The bracket spring has a portion projecting past the deceleration mass toward the blocking toothing and resting at the stationary part.

Expediently, the guide projections taper to a point in the direction of travel of the vehicle and the slotted holes taper to pointed end in the direction of travel, wherein the points and the pointed ends have a matching contour and wherein, in the rest position, the points of the guide projections rest at the matching pointed ends of the slotted holes.

Advantageously, the deceleration mass is guided at the pendulum mass along a slant that is upwardly inclined relative to the direction of travel, wherein the angle of incline of the slant defines the deflection threshold for the deceleration mass.

Preferably, the arms extend at the angle of incline from the pivot point.

In another embodiment of the present invention the safety belt reeling device according to the present invention is primarily characterized by:

A vehicle-sensitive acceleration sensor to be oriented in a nominal position to the center of the earth;

A pendulum device with a pendulum mass, pivotable about a pivot point, acting on the acceleration sensor for returning the acceleration sensor into the nominal position when an inclination change occurs;

An inertia mass in the form of a deceleration mass sensitive to horizontal acceleration forces, wherein the deceleration mass and the pendulum mass form a unitary part;

The unitary part having a slotted hole and a counter toothing;

A bearing pin for receiving the slotted hole of the unitary part such that the unitary part is pivotable about the bearing pin and displaceable in the direction of travel of the vehicle;

The slotted hole comprising two slanted portions inclined at an angle to the horizontal from the center of the slotted hole;

A stationary blocking toothing;

Wherein upon deflection of the unitary part the counter toothing engages the stationary blocking toothing in order to arrest the pendulum device at the safety belt reeling device.

Preferably, the safety belt reeling device further comprises a push rod connection connected to the pendulum mass, wherein the pendulum mass compensates the vehicle-sensitive acceleration sensor via the push rod connection.

In another embodiment of the present invention the safety belt reeling device further comprises a cover, wherein the blocking toothing is connected to the inner wall of the cover, wherein the unitary part is positioned in the cover and wherein the counter toothing is connected to the deceleration mass.

The basic idea of the present invention is that the inertia mass is a deceleration mass which responds to horizontal acceleration forces and which is guided slidingly and linearly with its slotted holes on guide projections provided at arms of the pendulum mass, extending in the direction of travel of the deceleration mass, from the pivot point so that upon deflection of the deceleration mass a counter toothing engages a stationary blocking toothing provided at the safety belt reeling device whereby the center of gravity of the deceleration mass in its rest position corresponds to the pivot point of the pendulum mass. This is advantageous because the threshold for response for the deceleration mass is very low so that already a minimal deflection of the pendulum mass under the influence of horizontal acceleration will arrest the pendulum mass in its position and the vehicle-sensitive sensor will not deflect past the tolerance range asigned thereto.

It is known from U.S. Pat. No. 4,004,751 that, for improving the response time, the acceleration sensor for activating the locking of the safety belt reeling device is embodied as a linearly guided mass which is loaded by a return force.

According to one embodiment of the invention, it is suggested that the deceleration mass in its rest position be secured by a separate sensor spring. With this support the deceleration mass is secured in a quasi floating manner and this allows for selecting an especially low threshold.

According to another embodiment of the invention the sensor spring can be a bar spring which acts on the center of gravity of the deceleration mass and which extends substantially vertically. Such a bar spring for returning an inertia mass in a switching device is known from U.S. Pat. No. 2,872,495.

In order to further improve the present invention so that even before activation of the deceleration mass any deflection of the pendulum mass due to horizontal accelerations acting thereon can be prevented, it is suggested to provide the sensor spring in the form of a bracket spring which is positioned at one side in the direction of travel of the vehicle between the deceleration mass and a part fixedly connected to the housing of the safety belt reeling device and which is supported (secured) between the deceleration mass and the stationary part. Expediently, the bracket spring according to one embodiment of the invention is secured in a groove provided at the end of the deceleration mass facing the blocking toothing of the safety belt reeling device and rests with is portion projecting past the end of the deceleration mass toward the blocking toothing so as to rest at the stationary part of the safety belt reeling device.

According to another embodiment of the invention, guiding of the deceleration mass into its engagement positions with the blocking toothing can be further improved by tapering the guide projections in the direction of travel of the vehicle so as to form points which, in the rest position of the deceleration mass, are in engagement with identically shaped tapered pointed ends of the slotted holes of the deceleration mass.

As an alternative to the sensor spring, the deceleration mass can be guided at the pendulum mass along a slanted plane which is positioned at an angle of incline to the horizontal and which thus defines the deflection threshold. Instead of the sensor spring a weight-related determination of the threshold is thus realized. In a further embodiment of this concept the arms provided at the pendulum mass are positioned at the same angle of incline relative to the pivot point of the pendulum mass.

In an alternative embodiment it is suggested with the invention that the inertia mass activated by horizontal acceleration forces is a deceleration mass and that the pendulum mass and the deceleration mass are embodied as a unitary part. The unitary part is pivotably supported with a slotted hole on a bearing pin acting as the pivot point and is displaceable in the direction of travel of the vehicle. The areas of the slotted hole on either side of the pivot point are positioned at an angle of incline to the horizontal and upon deflection of the unitary pendulum mass and deceleration mass a counter toothing thereof engages a stationary blocking toothing at the safety belt reeling device.

According to another embodiment of the invention the pendulum mass acts with a push rod connection on the vehicle-sensitive acceleration sensor in order to return it into the nominal position, as is, in principle, known from the vehicle sensor of German Offenlegungsschrift 36 11 004.

With respect to an especially space-saving embodiment of the inventive device, the pendulum device can be placed into the cover of the safety belt reeling device and the cover can be provided at its inner wall with the blocking toothing for engagement by a counter toothing provided at the deceleration mass.

BRIEF DESCRIPTION OF THE DRAWINGS

The object and advantages of the present invention will appear more clearly from the following specification in conjunction with the accompanying drawings, in which.

DESCRIPTION OF PREFERRED EMBODIMENTS

The present invention will now be described in detail with the aid of several specific embodiments utilizing FIGS. 1 through 6.

Figure 1:
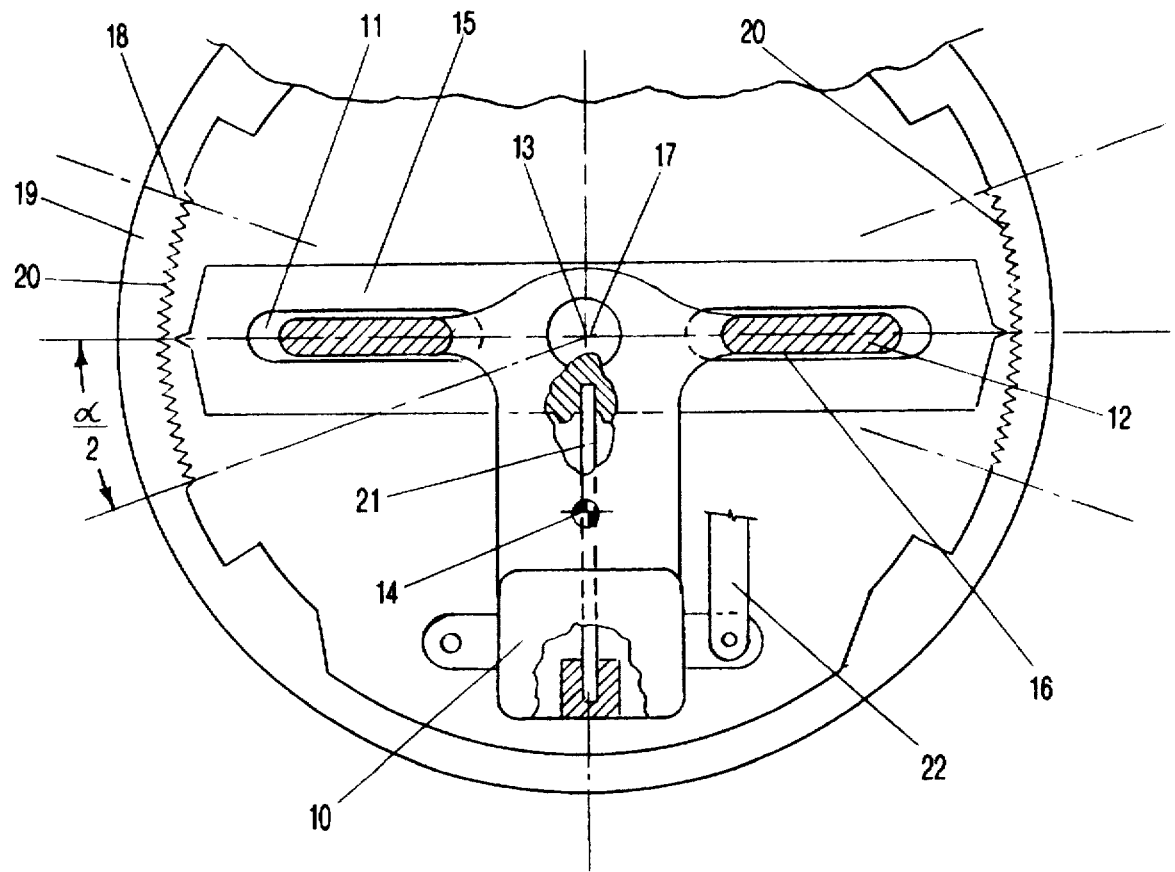
FIG. 1 is a first embodiment of a pendulum device with pendulum mass and deceleration mass in a plan view.

As can be seen in FIG. 1, a pendulum mass 10 is supported so as to be pivotable about a pivot point 13 at a stationary part of the housing of the safety belt reeling device whereby the pendulum mass 10 is provided with arms 11 extending laterally from the pivot point 13 in the horizontal direction of movement of the vehicle. The arms 11 are provided with guide projections 12. The pendulum mass 10 has a center of gravity below the pivot point 13 so that the pendulum function of the pendulum mass 10 is ensured.

A deceleration mass 15 is supported so as to be linearly displaceable at the pendulum mass 10 whereby the deceleration mass 15 is supported with its slotted holes 16 in a linearly displaceable fashion on the guide projections 12 of the pendulum mass 10. The center of gravity of the deceleration mass 15 is located at the pivot point of the pendulum mass 13 so that the deceleration mass 15 upon pivoting of the pendulum mass 10 for returning of the vehicle-sensitive sensor behaves neutrally. As can be seen in FIG. 1, the pendulum mass 10 has coordinated therewith an additional inertia mass in the form of the deceleration mass 15 so that a combined center of gravity 14 results which is positioned above the non-represented center of gravity of the pendulum mass 10. By bringing the center of gravity 14 closer to the pivot point 13, the pivoting tendency of the pendulum mass 10 with deceleration mass 15 is dampened and, accordingly, pivoting of the pendulum mass 10 for returning the vehicle-sensitive sensor occurs slowly, while blocking of the deceleration mass 15 for horizontal accelerations occurs quickly because it is independent of the center of gravity 14. This ensures that the pendulum mass 10 is oriented with only minimal deviations perpendicular to the center of the earth and that therefore the vehicle-sensitive sensor of the safety belt reeling device is always in the desired position.

In order to arrest the pendulum mass 10 when horizontally acting accelerations occur, the deceleration mass 15 at both ends is provided with a counter toothing 18 whereby this counter toothing 18 has coordinated therewith a blocking toothing 20 provided at the cover 19 of the safety belt reeling device. In the embodiment represented in FIG. 1, in both directions of acceleration, i.e., during acceleration from a stop and during braking of a vehicle, a linear displacement of the deceleration mass for engagement of the counter toothing 18 in the blocking toothing 20 at the cover 19 results.

The threshold for the linear displacement of the deceleration mass 15 upon horizontally occurring accelerations is determined in the embodiment according to FIG. 1 by the bar spring 21 which with one end is clamped at the pendulum mass and with the other end is clamped at the deceleration mass 15. The bar spring 21 is vertically arranged.

In the embodiment represented in FIG. 1 the pendulum mass 10 is also connected with a push rod 22 with the vehicle-sensitive sensor (not represented in this embodiment) so that the pivoting action of the pendulum mass 10 results in a return of the vehicle-sensitive sensor into its nominal position.

Figure 2:
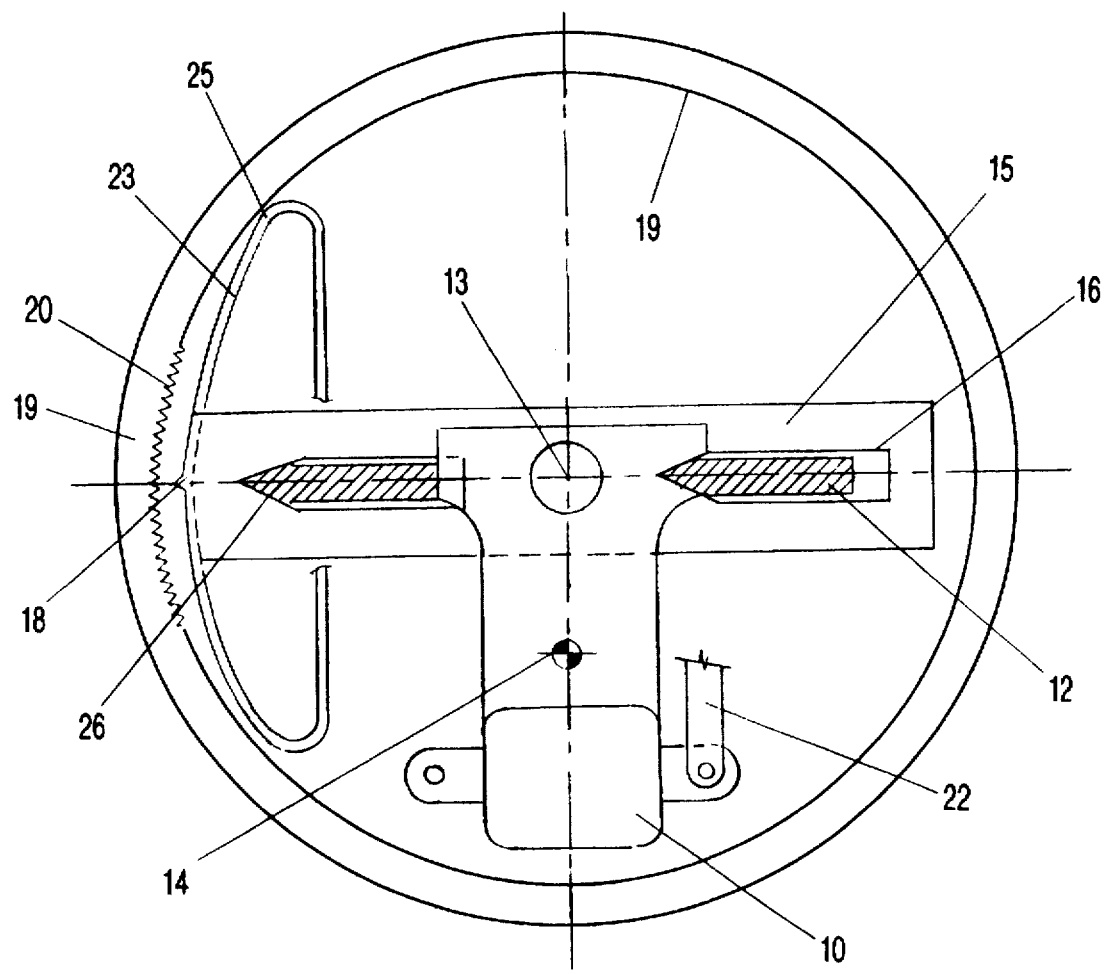
FIG. 2 shows another embodiment of the pendulum device according to FIG. 1.
Figure 3:
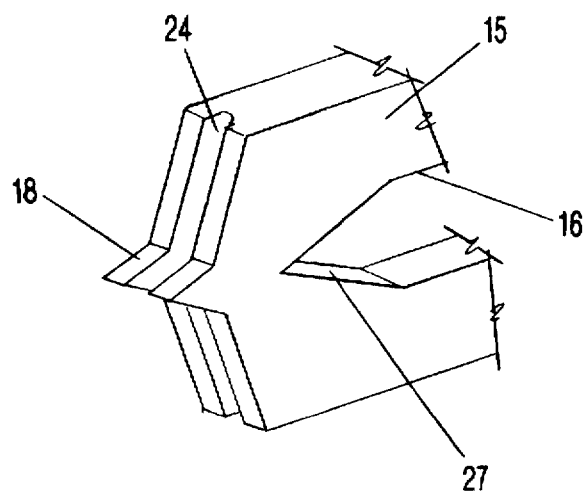
FIG. 3 shows the deceleration mass according to FIG. 2 in an enlarged detailed representation.

In the embodiment represented in FIGS. 2 and 3 the deceleration mass 15 can be displaced relative to the pendulum mass 10 only in one direction, i.e., in the direction of horizontal accelerations occurring during braking of the vehicle so that the blocking toothing 20 at the cover 19 and the counter toothing 18 at the deceleration mass 15 are only provided at one side. In the shown embodiment the sensor spring is in the form of a bracket spring 23 which is clamped between the deceleration mass 15 and the cover 19 and which with portion 25 projects past the end of the deceleration mass 15 to rest at the cover 19. In this embodiment the bracket spring 23 is inserted into a groove 24 provided at the deceleration mass 15 in the area of the counter toothing 18 and is secured thereat. For improving linear guiding, the guide projections 12 of the pendulum mass 10 are tapered in the direction of travel of the vehicle to form points 26 and, in the rest position of the deceleration mass 15, they engage correspondingly shaped pointed ends 27 of the slotted holes 16 of the deceleration mass 15.

In this embodiment, the spring bracket 23 also performs a damping function during the time period between the occurrence of horizontal acceleration forces and the activation of the deceleration mass 15 secured by the bracket spring 23 in that the tendency to deflect of the pendulum mass 10 before engagement of the deceleration mass 15 in the locking toothing 20 is prevented by the tension (prestress) of the bracket spring 23 positioned with its portion 25 at the cover 19 i.e., the existing pretension (prestress) of the spring prevents pivoting of the pendulum mass 10 before blocking by the deceleration mass 15 occurs.

Figure 4:
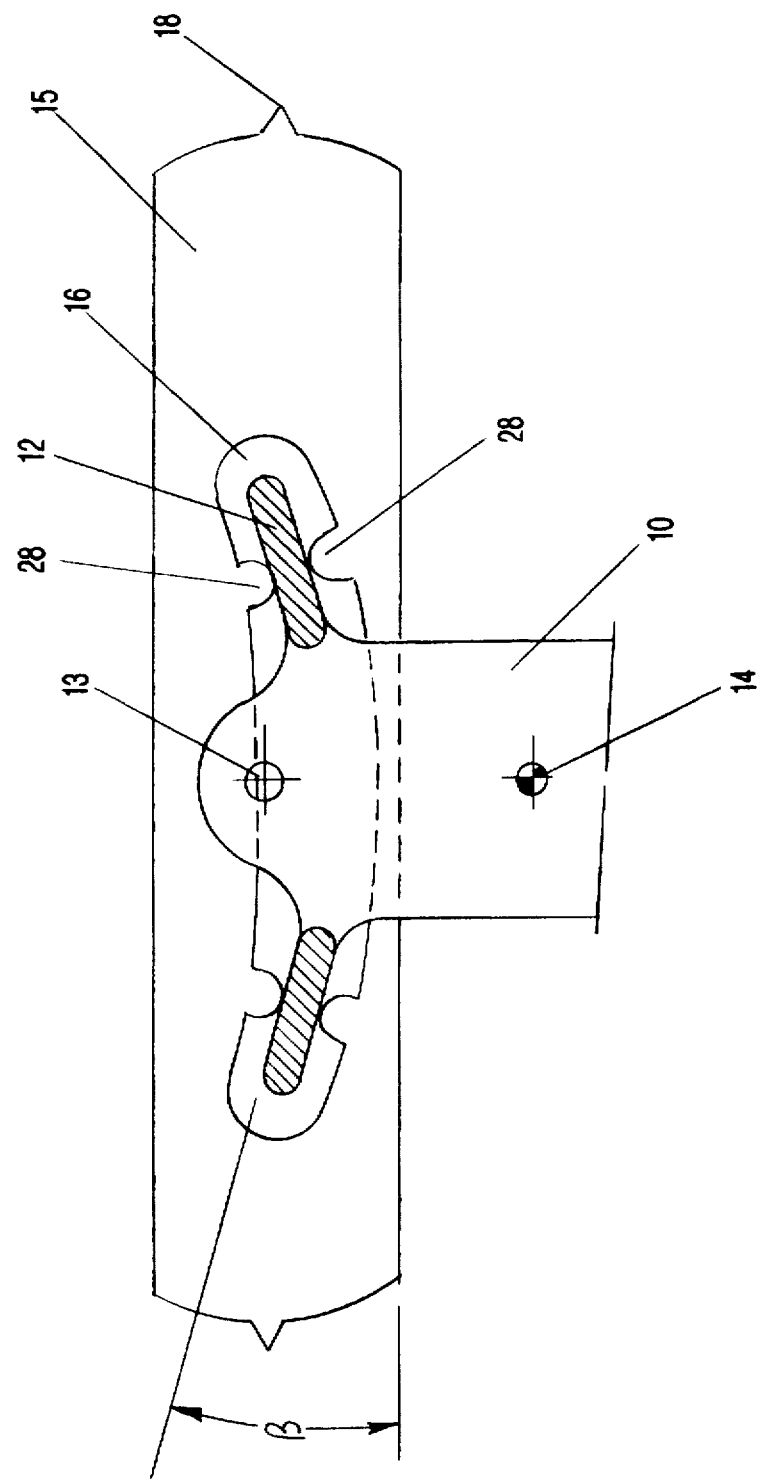
FIG. 4 shows another embodiment of the arrangement of the deceleration mass at the pendulum mass in a schematic representation.
Figure 5:
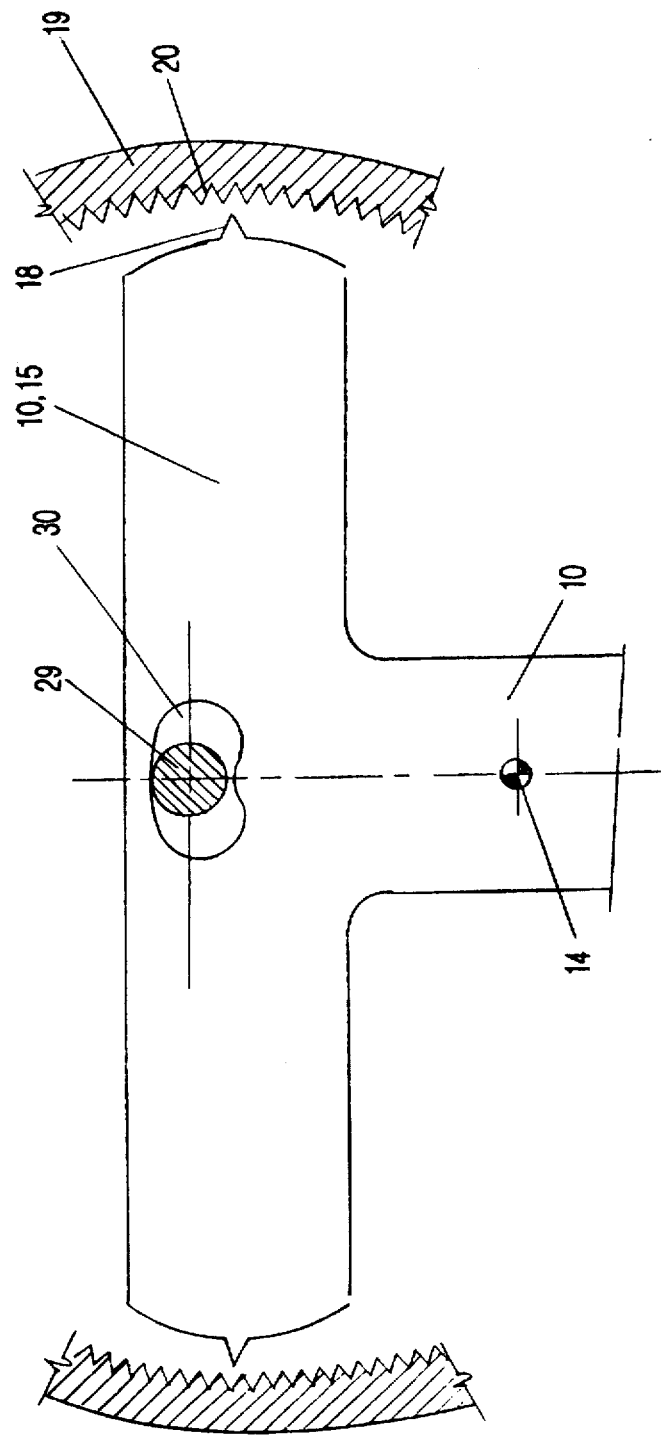
FIG. 5 shows a further embodiment of the invention in a representation according to FIG. 4.

The embodiment represented in FIGS. 4 and 5 concern alternative support arrangements of the deceleration mass 15 at the pendulum mass 10 not requiring a separate sensor spring. The threshold in these embodiments is realized with constructive measures in guiding the deceleration mass at the pendulum mass.

The embodiment of FIG. 4 shows a deceleration mass 15 at the pendulum mass 10 which is guided in a slanted plane which extends at an angle of incline to the horizontal in an upward direction relative to the direction of movement of the vehicle. The slanted plane is formed by respectively slantedly arranged arms 11 of the pendulum mass extending from the pivot point. For an improved guiding of the deceleration mass 15 at these slantedly arranged arms 11, respectively, at the guide projections 12 provided thereat, the slotted holes 16 of the deceleration mass 15 are provided with constrictions 28.

The embodiment represented in FIG. 5 shows the deceleration mass and the pendulum mass as a unitary part which is pivotably supported with a centrally arranged slotted hole 30 on a bearing pin 29 providing the pivot point. The portions of the slotted hole on either side of the pivot point 29 (in the rest position) are positioned at an angle of incline to the horizontal so that a longitudinal displacement of the pendulum mass 10 with deceleration mass 15 on the bearing pin is possible.

Figure 6:
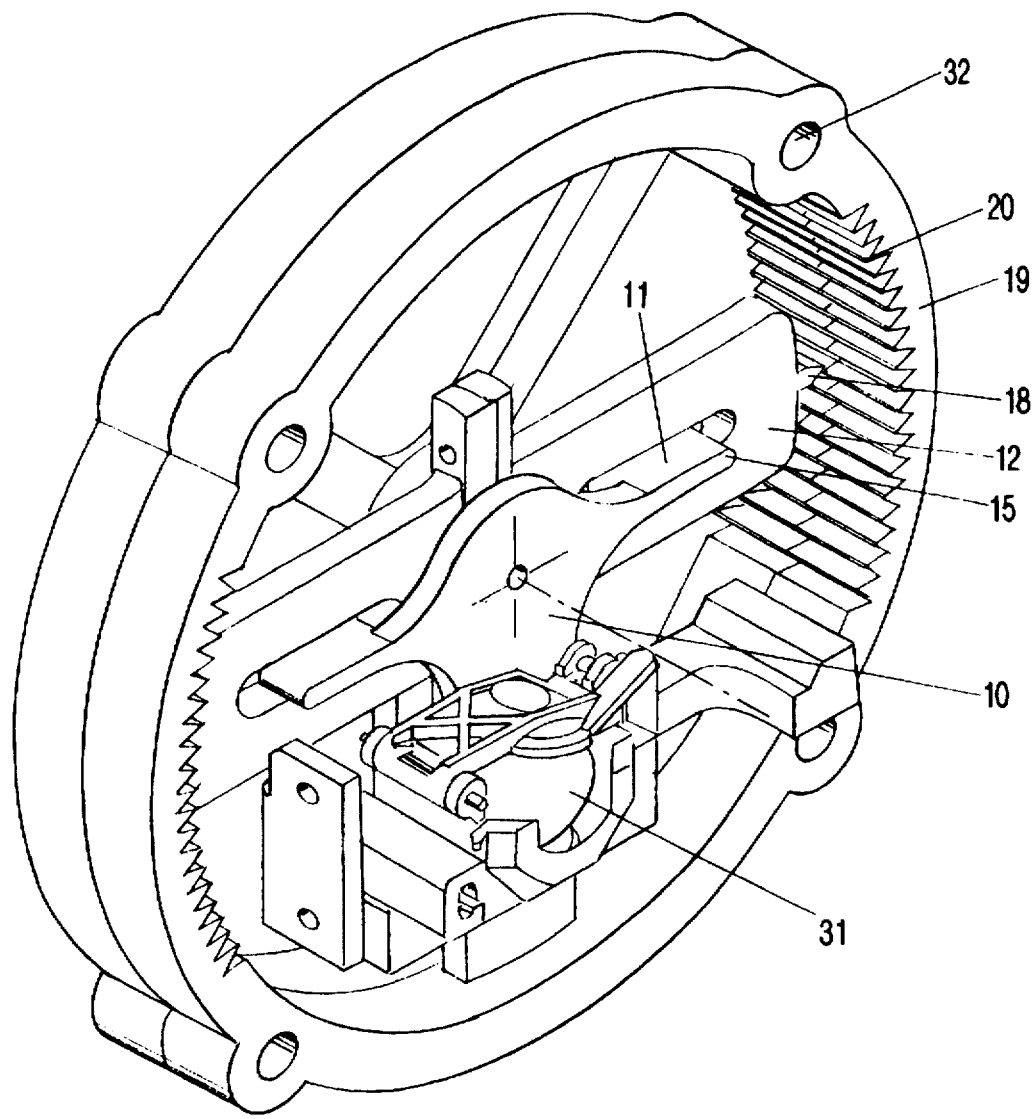
FIG. 6 shows the embodiment according to FIG. 1 in a perspective view.

FIG. 6 shows the entire apparatus including the pendulum mass 10 with deceleration mass 15 of FIG. 1. In this view there is also visible the vehicle-sensitive sensor 31 which is directly supported at the pendulum mass 10. In this embodiment an especially simple mounting of the entire system is possible because the cover 19 receives the functional parts and can be connected with screws to be inserted into the bores 32 to the safety belt reeling device.

The present invention is, of course, in no way restricted to the specific disclosure of the specification and drawings, but also encompasses any modifications within the scope of the appended claims.

What I claim is:

1. An inclination-compensatable safety-belt reeling device connected to a vehicle seat, wherein the part of the vehicle seat to which said safety belt reeling device is connected is inclination-adjustable relative to an axis extending to the center of the earth, said safety belt reeling device comprising:

a vehicle-sensitive acceleration sensor to be oriented in a nominal position relative to the center of the earth;

a pendulum device with a pendulum mass, pivotable about a pivot point, and connected to said acceleration sensor for returning said acceleration sensor into the nominal position when an inclination change occurs;

an inertia mass in the form of a deceleration mass sensitive to horizontal acceleration forces;

a stationary blocking toothing;

said pendulum mass having laterally projecting arms extending in horizontal directions of movement of said deceleration mass;

said arms having respective guide projections;

said deceleration mass having slotted holes for respectively receiving said guide projections, wherein said guide projections are slidingly linearly guided in said slotted holes for movement in said horizontal directions;

said deceleration mass having at least one toothing positioned opposite said blocking toothing for engaging said blocking toothing when deflected from a rest position by horizontal acceleration forces in order to arrest said pendulum device of said safety belt reeling device;

wherein a center of gravity of said deceleration mass in said rest position is located at said pivot point of said pendulum mass.

2. A safety belt reeling device according to claim 1, further comprising a sensor spring for securing said deceleration mass in said rest position.

3. A safety belt reeling device according to claim 2, wherein said sensor spring is a vertically extending bar spring having a point of application at said center of gravity of said deceleration mass.

4. A safety belt reeling device according to claim 2, wherein said sensor spring is a bracket spring positioned at one side of said deceleration mass in the direction of travel of the vehicle and supported at a stationary part of said safety belt reeling device and at said deceleration mass.

5. A safety belt reeling device according to claim 4, wherein said deceleration mass has a groove facing said blocking toothing and wherein said bracket spring is secured in said groove, said bracket spring having a portion projecting past said deceleration mass toward said blocking toothing and resting at said stationary part.

6. A safety belt reeling device according to claim 1, wherein each said guide projections taper to a point in the direction of travel of the vehicle and wherein each said slotted holes taper to a pointed end in the direction of travel, wherein said points and said pointed ends have a matching contour and wherein, in said rest position, said points of said guide projections respectively rest at said matching pointed ends of said slotted holes.

7. A safety belt reeling device according to claim 1, wherein said deceleration mass is guided at said pendulum mass along a slant that is upwardly inclined relative to the direction of travel of the vehicle, wherein the angle of incline of said slant defines a deflection threshold for said deceleration mass.

8. A safety belt reeling device according to claim 7, wherein said arms extend at said angle of incline from said pivot point.

9. A safety belt reeling device according to claim 1, further comprising a push rod connection connected to said pendulum mass and said vehicle-sensitive acceleration sensor, wherein said pendulum mass returns said vehicle-sensitive acceleration sensor via said push rod connection into said nominal position.

* * * * *

UNITED STATES PATENT AND TRADEMARK OFFICE
CERTIFICATE OF CORRECTION

PATENT NO. : 5,791,582
DATED : August 11, 1998
INVENTOR(S) : Hans-Helmut Ernst

It is certified that error appears in the above-indentified patent and that said Letters Patent is hereby corrected as shown below:

On the title page,

[30]   Foreign Application Priority Data
       August 2, 1995   [DE]   Germany......195 28 387.2

Signed and Sealed this

Third Day of August, 1999

Attest:

Attesting Officer

Q. TODD DICKINSON

Acting Commissioner of Patents and Trademarks